United States Patent [19]
Schmidt

[11] 3,854,328
[45] Dec. 17, 1974

[54] RESILIENCY TESTING DEVICE
[75] Inventor: Robert J. Schmidt, El Cerrito, Calif.
[73] Assignee: Chevron Research Company, San Francisco, Calif.
[22] Filed: Jan. 18, 1973
[21] Appl. No.: 324,637

[52] U.S. Cl. ................................................ 73/91
[51] Int. Cl. ............................................ G01n 3/32
[58] Field of Search ......... 73/100, 94, 88 R, 89, 91; 33/147 R, 147 D, 148 D, 143 L, 148 H, 149 J

[56] References Cited
UNITED STATES PATENTS

| | | | |
|---|---|---|---|
| 2,173,493 | 9/1939 | Peters | 73/141 A |
| 2,423,867 | 7/1947 | Zener et al. | 73/88.5 R |
| 3,546,931 | 12/1970 | Crews, Jr. et al. | 73/97 X |
| 3,548,646 | 12/1970 | Holman | 73/97 |

FOREIGN PATENTS OR APPLICATIONS
1,109,238   4/1968   Great Britain ...................... 33/149 J

*Primary Examiner*—Jerry W. Myracle
*Attorney, Agent, or Firm*—G. F. Magdeburger; C. J. Tonkin; B. G. Fehringer

[57] ABSTRACT

An apparatus is provided for testing the resiliency of materials. The device comprises a means for applying an external force to a sample mounted in a frame to cause a deformation of the sample and a detector securely mounted on the frame which detects the deformation so caused. A method for measuring the resiliency of a sample is also provided. The method comprises attaching a detector of deformation to a sample, applying an external force to the sample to deform the sample and detecting the deformation of the sample as indicated by the detector.

24 Claims, 4 Drawing Figures

RESILIENCY TESTING DEVICE

FIELD OF THE INVENTION

This invention relates to a device for measuring the resiliency of a sample. More particularly, this invention relates to a device which measures the resiliency of a sample upon application of a known external force to the sample. The device has particular application in measuring the resiliency of samples of asphalt concrete materials.

THE PRIOR ART

The resiliency of samples and particularly of samples of asphaltic concrete materials has been determined previously by mounting the sample on a sample receiver attached to a stationary base. A unidirectional compressive force is then applied to the sample in the direction of the sample receiver. Detectors mounted on the base and adjustably contacting the sample in a plane substantially at right angles to the direction of the unidirectional compressive force measure the deformation of the sample when subjected to this force. This method has a serious drawback, however. When the force is applied to the sample it is compressed in the direction of the force; this means that that part of the sample which was contacted by the detectors moves laterally with respect to the detectors. Many samples, and particularly asphalt concrete samples, do not have perfectly smooth surfaces. When the sample is compressed, the detectors move across the uneven surface. Quite often the unevenness of the surface is greater than the deformation of the sample and meaningless data is obtained.

The only way to obtain meaningful data using the type of apparatus described above is to subject the sample to sufficient external force to cause a deformation large enough that the unevenness of the surface of the sample is only a small percentage of the deformation measured. This usually involves complete destruction of the sample.

If a test is to be run to determine the effect of certain conditions on a material and a series of measurements are to be made, it is necessary that the number of samples available at least equal the number of measurements to be made and each of these samples must be subjected to the same conditions. In many cases this can involve the handling of a very large number of samples; a great inconvenience if not a physical impossibility due to space limitations.

It is highly desirable to be able to non-destructively test the resiliency of a sample. This would allow a particular sample to be subjected to various test conditions, tested for resiliency, and returned for further testing. The advantage would be that a very small number of samples would have to be handled even though a large number of resiliency tests were contemplated.

SUMMARY OF THE INVENTION

I have now found that the resiliency of a sample can be determined without destroying the sample by using the apparatus of the invention. My apparatus for measuring the resiliency of a sample comprises a means for applying an external force to a sample to deform the sample, a frame means, a means for mounting a sample to be tested in the frame means, and a sensing means mounted on the frame means, the sensing means operatively arranged to sense a deformation of the sample.

By use of this apparatus, the sensing means are mounted onto and move with the sample. Accordingly, the sensing means do not move over the surface of the sample and do not detect the unevenness of the sample. The sensing means only detect the deformation of the sample and meaningful data about the resiliency of the sample is obtained without destroying the sample.

DETAILED DESCRIPTION OF THE INVENTION

The apparatus of this invention is principally adapted for measuring the resiliency of a sample of a material. The apparatus is particularly adapted for measuring the resiliency of an asphaltic concrete material and is particularly well adapted for measuring the resiliency of such a sample if the sample is in the form of a solid cylinder.

The apparatus comprises a means for applying external force to such a sample to deform the sample and a means for detecting the deformation so produced. The means for detecting the deformation comprises a frame means and a means for mounting a sample to be tested in the frame means. It also includes a sensing means attached to the frame means with a detector in the sensing means. The detector is adapted and arranged to generate a signal proportional to the deformation of the sample produced by the external force described above. The detector means is operatively connected to a recording means for recording the signals so produced.

In a preferred embodiment of this invention, the signal generated by the detector is an electrical signal. In a more preferred embodiment of this invention, the means for recording the signal is adapted to record the signal visually.

Figure 1:
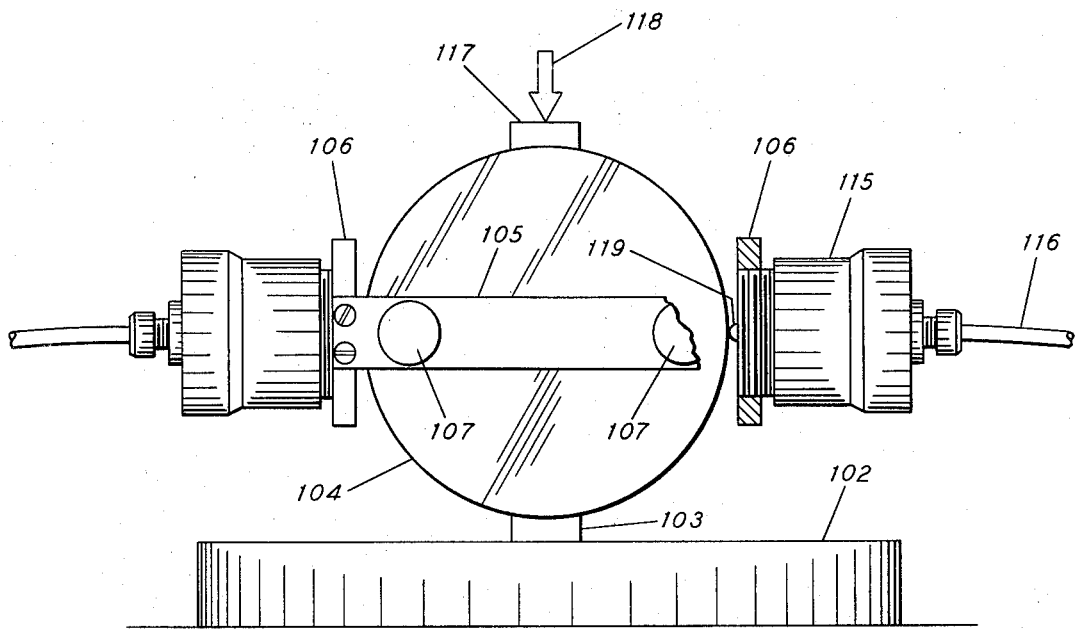
FIG. 1 is an elevation partially in section of one embodiment of the invention. In this drawing, a sample to be tested is shown mounted in the apparatus.

Reference is now made to FIG. 1 of the drawings. FIG. 1 depicts one embodiment of the apparatus of this invention in which a solid cylindrical sample 104 to be tested is mounted in the apparatus. The apparatus is comprised of a base 102 having a first receiving element 103 on the base. Receiving element 103 is constructed to receive a sample 104 to be tested. A frame means shown in this embodiment as a rectangular frame structure constructed of a first pair of parallel side members 105 and a second pair of parallel members 106 has sample 104 mounted within it by use of means 107 for mounting the sample within the frame. In this embodiment the means 107 for mounting the sample in the frame comprise two sets of opposingly acting screws screw-threadedly mounted in the frame. In FIG. 1 only one of each pair of screws is shown. Two sensing means 119 are diametrically mounted on the frame relative to sample 104. Each of the sensing means is adapted and arranged to operatively engage the sample to detect a deformation of the sample. Each of the sensing means is operatively connected to an electrical signal generating means to generate a signal proportional to the deformation detected. In this embodiment the electrical signal generating means comprises a voltage source not shown and a modified Wheatstone bridge, also not shown, but housed within housing 115. The electrical signal generating means is operatively connected to a means for recording the signal by means of line 116 which also operatively connects the Wheatstone bridge to the voltage source. A second receiving element 117 is positioned to operatively engage the sample 104 substantially diametrically opposite the firt receiving element 103. An external force exerting means, diagrammatically represented as arrow 118 in FIG. 1, operatively engages the second receiving element. The external force exerting means is adapted to apply a force in the direction of arrow 118 to cause a compression of sample 104 between the first receiving element 103 and the second receiving element 117.

Figure 3:
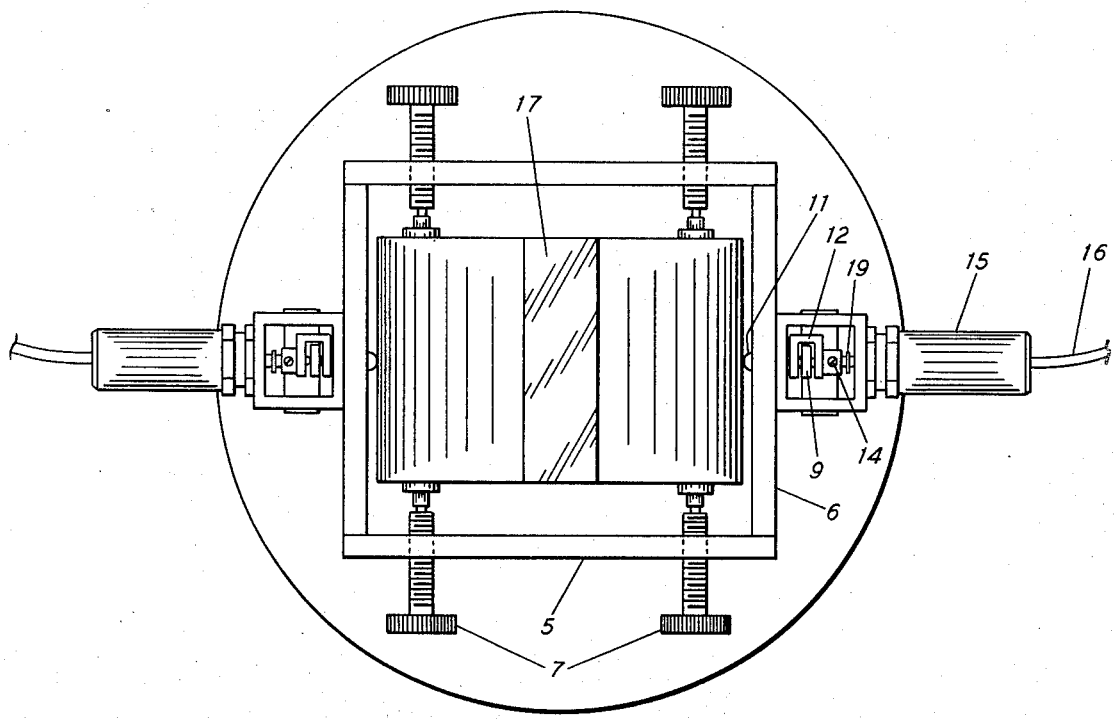
FIG. 3 is a plan view of the embodiment of this invention shown in FIG. 2.
Figure 2:
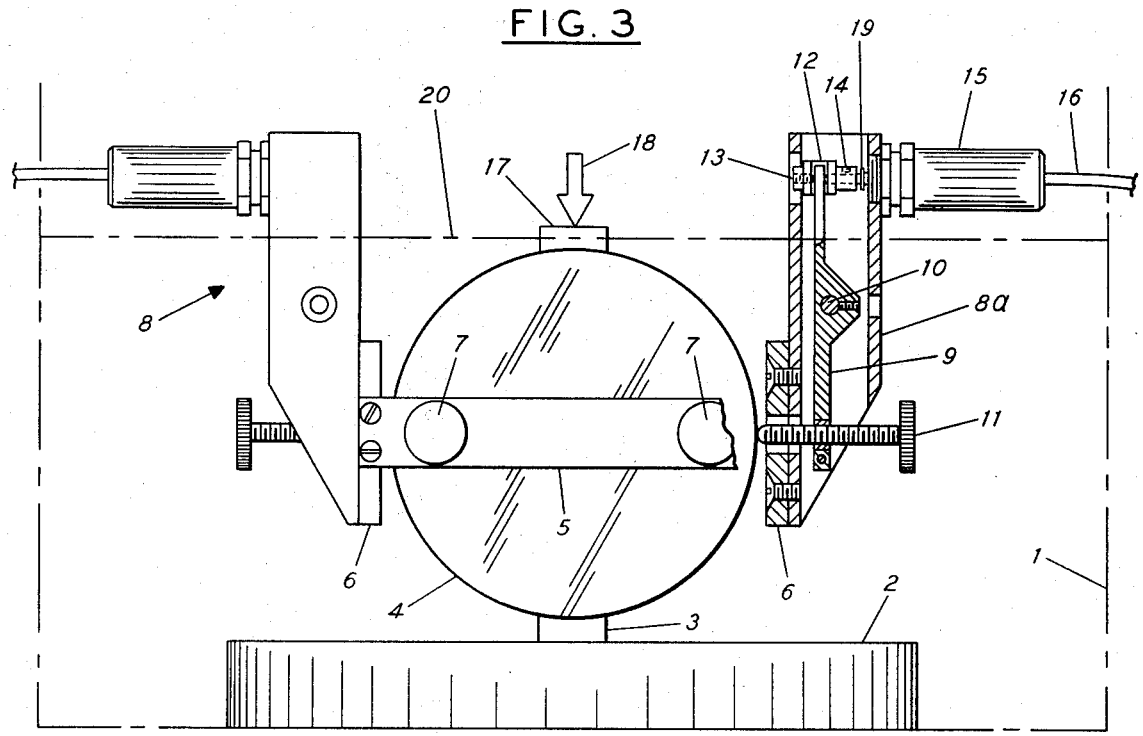
FIG. 2 is an elevation partially in section of another embodiment of the invention. A sample to be tested is shown mounted in the apparatus in this drawing also.

Reference is now made to FIGS. 2 and 3. In FIG. 2, container 1, shown in phantom, provides a means for containing a fluid. Base 2 rests on the bottom of container 1. A first receiving element 3 rests on base 2. It is constructed to receive a sample 4. A rectangular frame structure constructed from a first pair of parallel members 5 and second pair of parallel members 6 is mounted on sample 4 by securing means 7 which, in this embodiment, comprises two pairs of opposingly acting screws which are screw-threadedly mounted to frame members 5. Two sensing means 8 are diametrically mounted on the frame structure on elements 6 relative to sample 4. Each of the sensing means is adapted and arranged to operatively engage the sample to detect a deformation of the sample. Each of the sensing means comprises a housing 8a, an element 9 pivotally mounted in the housing on pivot 10. The element has a first end positioned adjacent to the sample 4 and a second end positioned on the opposite side of the pivot. An adjustable screw means 11 is screw-threadedly mounted in the first end and positioned to adjustably contact the sample. The adjustable screw means is adapted to be displaced by a deformation of the sample thereby displacing the first end and pivotally displacing the element. A clamp means 12 is adjustably clamped by means of screw 13 to the second end of the element. A detector 19 is fixedly secured by means of set screw 14 to the clamp and is operated thereby. The detector is operatively connected to an electrical signal generating means to generate a signal proportional to the displacement of the first end. In the embodiment shown in FIGS. 2 and 3, the electrical signal generating means is a voltage source not shown and a modified Wheatstone bridge, also not shown, but housed within housing 15. Means is provided for recording this signal which is operatively connected to the signal generating means by means of line 16. A second receiving element 17 operatively engages the sample 4 at a location substantially diametrically opposite the first receiving element 3. Arrow 18 diagrammatically represents an external force exerting means and a force detector means which exert a unidirectional compressive force to receiving element 17 which compresses sample 4 substantially in the direction of arrow 18. This compressive force results in a deformation of sample 4, one manifestation of which is an increase in the diameter of the sample between screw means 11. Since the two sensing means are securely fixed in place relative to the sample by means of the rectangular frame and the securing means 7, an increase in the diameter of the sample between screw means 11 causes a displacement of the screw means away from each other. This in turn causes a displacement of the first end of element 9 which pivots about pivot 10 causing a displacement of the second end of the element. Clamp means 12 which adjustably engages the second end is also displaced and the detector means 15 which is fixedly secured to the clamp is also displaced. In this embodiment, this last displacement causes the Wheatstone bridge to be unbalanced, thereby generating an electrical signal which is recorded by the means for recording of the signal connected to the detector 15 by means of line 16.

Container 1 is present to contain a fluid, such as water, to allow submersion of sample 4 in this fluid and to allow measuring the resiliency of the sample while submerged. The embodiment represented in FIGS. 2 and 3 presents a distinct advantage when the resiliency of a submerged sample is to be determined. The electrical signal generating means housed in housing 15 are supported at a location sufficiently above the highest point of sample 4 so as to not come in contact with the fluid when the sample is completely submerged as indicated by water level 20 in FIG. 2. This alleviates the necessity of waterproofing the electrical signal generating means as would be required if the apparatus depicted in FIG. 1 were submerged for testing of sample 104.

The force exerting means represented diagrammatically by arrow 118 in FIG. 1 and arrow 18 in FIG. 2 can be any convenient means for applying an external unidirectional force to the sample. For example, a rigid upright element rigidly affixed to the base and extending laterally upward from the base to a point above the sample could be provided with a lever pivotally attached thereto. The lever would engage the second receiving element 117. By appropriately moving the lever a compressive force would be exerted on the sample.

Preferably, the means for applying an external force to the sample comprises a plurality of screw-threaded elements rigidly affixed to the base and extending laterally from the base. A movable support is slideably connected to the screw-threaded elements and adapted to be moved toward and away from the base. Nut means operatively engaging the screw-threaded elements adjustably fix the position of the movable support relative to the base. A pulsating force exerting means is securely affixed to the movable support and adapted and arranged to exert a force toward the base and to relieve the force.

Although not required, it is preferable that the force exerted towards the base be measured. This can be accomplished by the use of a force detector means which is operatively connected to a first signal generating means which generates a first signal proportional to the force exerted on the force detector. The electrical signal generating means is then operatively connected to a means for recording the signal.

In a preferred embodiment, the movable support has a handle means connected thereto to aid in slideably positioning the movable support on the screw-threaded elements.

In a more preferred embodiment, the pulsating force exerting means is a pneumatic motor which is positioned to exert a force toward the first receiving element. The pneumatic motor is controllably connected to a compressed air supply. The control can be any convenient control means such as an electrically operated selenoid valve.

When the sample is to be submerged in a fluid for testing, it is preferably that the second receiving element 17 extend sufficiently above the upper surface of sample 4 to allow the sample to be completely submerged and yet prevent the force detector from coming into contact with the fluid.

Figure 4:
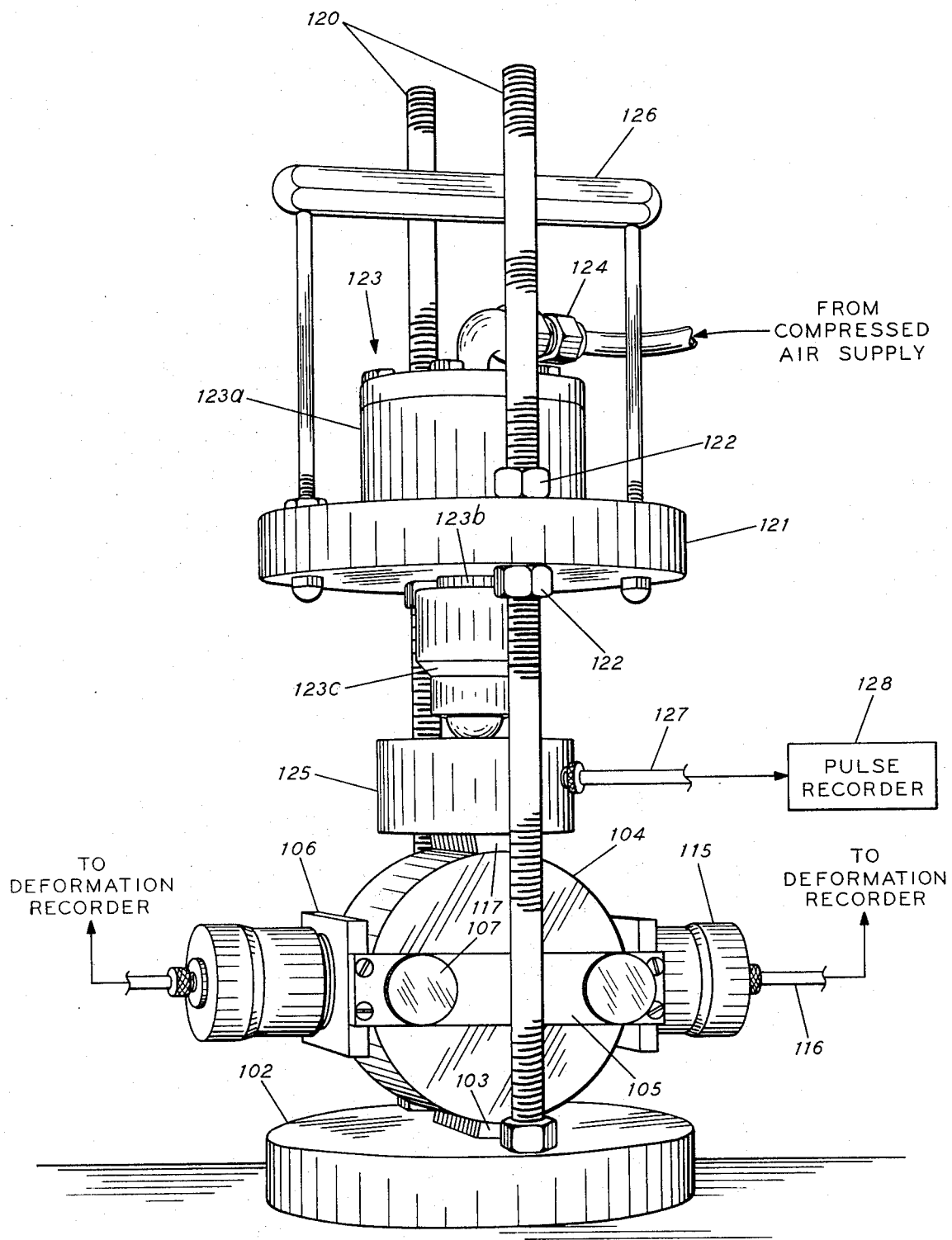
FIG. 4 is a perspective view of the embodiment shown in FIG. 1 in which the force exerting means represented by arrow 118 is shown in detail.

Reference is now made to FIG. 4 of the drawings. FIG. 4 represents a perspective view of the embodiment of FIG. 1. In FIG. 4, the force exerting means represented by arrow 118 in FIG. 1 is shown by elements 120–124 and 126. A force detector and means for recording the signal from the force detector are shown by elements 125, 127 and 128.

In FIG. 4, a solid cylindrical sample 104 to be tested is mounted in the apparatus. The apparatus is comprised of elements 102–107 and 115–117 which were described above with reference to FIG. 1. The preferred means for applying an external force to the sample comprises a plurality, in this case, two screw-threaded elements 120 rigidly affixed to base 102 and extending laterally therefrom. A movable support 121 is slideably connected to the screw-threaded elements and adapted to be moved toward and away from the base. Nut means 122 operatively engage the screw-threaded elements to adjustably fix the position of the movable support relative to the base. A pulsating force exerting means, in this case, a pneumatic motor shown generally at 123 is securely affixed to the movable support and adapted and arranged to exert a force toward the base and to relieve the force. The pneumatic motor comprises the cylinder 123*a* and the piston 123*b* which extends through a hole in the movable support 121. A ram 123*c* is affixed to the piston. The pneumatic motor is controllably connected to a compressed air supply through the fitting and hose 124. The control for the pneumatic motor can be any convenient control means such as an electrically operated solenoid valve (not shown) and a timer clock (not shown).

The force exerted by the pneumatic motor towards the base is measured by load cell 125 which houses a first signal generating means which generates a first signal proportional to the force exerted on the load cell. The first signal generating means is operatively connected, in this case, by electrical wiring 127, to a means for recording the signal shown diagrammatically as pulse recorder 128.

For ease of assembly and use, the movable support has a handle 126 connected thereto to aid in slideably positioning the movable support on the screw-threaded elements.

The apparatus of this invention can be constructed from readily available common materials. For example, many of the parts such as the base, the rectangular frame, the movable support, etc., can be constructed from aluminum which has the advantage of having the requisite structural strength while being relatively lightweight and available in many different shapes and sizes. The screw-threaded elements discussed above as part of the preferred embodiment of the external force exerting means are conveniently constructed from one-half or five-eighths-inch diameter threaded rod. The first and second receiving elements for receiving the sample are conveniently constructed of aluminum. Preferably, they have one flat surface for engaging the base and the external force exerting means and a curved surface of substantially the same radium of curvature as the sample if the sample is a cylindrical sample.

The rectangular frame preferably is constructed of a lightweight material such as aluminum. The means for securing the frame to the sample can be any device which securely fastens the frame to the sample. One convenient device is four screws, with two of the screws mounted in one side of the frame and two screws mounted in an opposite side of the frame. Conveniently, the screws are capped with nylon caps or rubber-surfaced metal caps to provide excellent contact with the sample without gouging it.

The sensing means can be any device which can be adapted to sense the deformation of the sample. This can be a mechanical device such as a micrometer or an electrical device such as a strain gauge. Preferably, the sensing means are electrical devices. Generally, these electrical devices are constructed with a mechanical tip which can be adjustably brought into contact with the sample. The mechanical tip is then operatively connected to a suitable electrical signal generating means. This electrical signal generating means can be the electrical part of a strain gauge, i.e., a device which possesses the property of having a resistance which varies in accordance with a force exerted thereon. Alternatively, it can be a modified Wheatstone bridge connected to a voltage supply. Movement of the mechanical contact unbalances the bridge and changes the voltage output of the bridge. This change in voltage can then be recorded by any suitable means.

The sensing means are conveniently combined with the electrical signal generating means in a single housing. Such devices are available commercially, such as the Baldwin strain gauges. A combined sensing means and electrical signal generating means which is quite suitable for use in the apparatus of this invention is a transducer available from Statham designated as UC-3.

The means for recording the signal generated by the signal generating means can be any suitable device such as the dial of a micrometer, a meter which responds to an electrical signal or a strip chart recorder which records a trace on a moving strip of paper. One such suitable recorder is a Hewlett-Packard Model 7702B recorder coupled with a Hewlett-Packard Preamplifier Model 8805A.

The force detector which is operatively connected to the external force exerting means and the second receiving element also is conveniently combined with the signal generating means in a single housing which is then conveniently connected by electrical leads to a recording device such as the Hewlett-Packard recorder described above. A number of load cells are commercially available which are suitable for this use. For testing asphaltic concrete materials, a load cell having a maximum capacity of 150 pounds is generally suitable.

My method for measuring the resiliency of a sample of a material comprises attaching a detector of deformation of a sample to the sample, applying an external force to the sample to deform the sample, and detecting the deformation of the sample, as indicated by the detector. Preferably, the detector of deformation comprises two detectors of deformation which are attached on opposite sides of the sample or, in case of a cylindrical sample, diametrically to the sample. Preferably, the external force is a unidirectional force which is applied in a direction substantially perpendicular to a line described between the two opposingly attached detectors and which substantially bisects that line. Preferably, the sample which is subjected to the resiliency measurement is a solid cylindrical sample of an asphaltic concrete material. Preferably, the unidirectional external force is a compressive force applied to a curviplanar portion of the sample and the deformation of the sample is detected on a curviplanar portion of the sample. Preferably, the deformation of the sample is detected on diametrically opposed curviplanar portions of the sample.

Preferably, the unidirectional external force is applied by means of a pneumatic motor which is adapted to apply pulsating loads of varying durations at varying intervals. A particularly useful duration and frequency is application of a load for 0.1 second repeated 20 times per minute. This pulse duration and frequency is convenient because it corresponds to work done in other fields. For example, the 0.1-second load application is of about the same duration as is obtained in measuring pavement deflection by other methods. The three-second pulse application frequency is close to ideal since a pause of this duration between load applications allows substantially complete viscoelastic recovery of the test specimen.

The calibration of the load cell and the sensing means used to detect the deformation of the sample can be accomplished by conventional techniques. For example, the load cell can be calibrated by applying known forces to the cell and recording the electrical signal generated by the load cell. The transducers used as the sensing means for the sample deformation can be calibrated by attaching them to a micrometer in such a manner that the micrometer rod causes a displacement of the transducer contact. In this manner, the signal output of the transducer can be calibrated to the microinches of displacement of the sample contact. By knowing the external force applied to the sample and the degree of deformation caused in the sample, the resilient modulus of the sample can be calculated. Techniques for making this calculation are described in "A Practical Method for Measuring the Resilient Modulus of Asphalt-Treated Mixes," by R. J. Schmidt in a paper presented at the Highway Research Board Meeting Jan. 18, 1972.

EXAMPLE

The resiliency of an asphaltic concrete material is determined as follows:

An apparatus substantially as shown in FIG. 2 is used. A solid cylindrical asphaltic concrete sample is prepared which is 2 l inches thick and 4 inches in diameter. This sample is securely mounted within the frame such that the screw means 11 diametrically contact the sample. The assembly is lifted by grasping the sample and placed on the receiving element resting on the base. The upper receiving element, the load cell and the movable support with the pneumatic motor are placed in position and immovably fixed with the nut means on the screw-threaded elements. Adjustable screws 11 are adjusted to be in contact with the sample and the output from the transducers is adjusted to be within the range of the recorder. Air pressure to the pneumatic motor is adjusted to yield a peak load of 75 pounds as indicated by the load cell output to the recorder. The electric timer for the air solenoid valve is turned on and a load of one-tenth second duration every three seconds is applied to the sample. The system is operated for 100 cycles at a low chart speed at which time the chart speed is changed to 100 mm/sec. Several pulses of the load and deformation are recorded at this high chart speed.

The sample and frame are then removed from between the receiving element and the adjustable screws are retracted. The sample is rotated 90° are resecured in the frame. The adjustable screws are reset and the frame and sample are replaced between the receiving elements. The repetitive loading is repeated for about 100 cycles before the high chart speed is used to record several pulses of the load and deformation. The resilient modulus is then calculated from the data obtained at the high chart speed. The results obtained from the same specimen in the two positions generally agrees within 10 percent although the resilient modulus of certain asphalt concrete materials made from certain aggregates may vary as much as 20 percent. If the differences are greater than these values, the sample is rotated back to the original position and the testing is repeated.

While the apparatus and method of the invention have been described with particularity and in great detail, it is apparent to those skilled in the art that numerous modifications can be made to the apparatus and method of this invention and such are considered to be within the scope of the invention. It is also apparent that, with the disclosed apparatus, deformations of the magnitude of micro inches can be measured accurately without destruction of the test specimens and that the ability to make such measurements represents a substantial advancement over the prior art devices for measuring the resiliency of samples.

I claim:

1. An apparatus for use in measuring the resiliency of a sample comprising:
   a frame means,
   means for mounting a sample to be measured in said frame means,
   means for applying a pulsating external force to the said sample to cause said sample to sequentially deform and recover in sequential deformations and recoveries corresponding to said force,
   sensing means on said frame means, said sensing means operatively arranged to sense a deformation and recovery of said sample, and
   means for recording said sequential deformations and recoveries.

2. The apparatus of claim 1 wherein said means for applying said external force comprises a support constructed to receive a said sample and means for forcing the said sample against said support to deform said sample.

3. An apparatus for use in measuring the resiliency of a sample of an asphaltic material comprising:
   a frame means, means for mounting a sample to be measured in said frame means, means for applying a pulsating external force to the said sample to cause said sample to sequentially deform and recover in sequential deformations and recoveries corresponding to said force, sensing means on said frame means, a detector in said sensing means, said detector adapted and arranged to generate a signal proportional to said deformation and recovery of the said sample, and means for recording said signal operatively connected to said detector means.

4. The apparatus of claim 3 wherein said signal is an electrical signal.

5. The apparatus of claim 4 wherein said recording means is adapted to record said signal visually.

6. The apparatus of claim 3 wherein said recording means is adapted to record said signal visually.

7. The apparatus of claim 3 wherein said means for applying said external force comprises a support constructed to receive the said sample and means for forcing the said sample against said support, and wherein said sensing means is adapted and arranged to engage the said sample on opposite sides thereof to detect the deformation and recovery of said sample, said detector is operatively connected to an electrical signal generating means to generate an electrical signal proportional to said deformation and recovery so detected, and means for recording said signal is operatively connected to said signal generating means.

8. An apparatus for use in measuring the resiliency of a cylindrical sample of an asphaltic concrete material comprising:

means for applying a pulsating external force to a said sample to cause said sample to sequentially deform and recover in sequential deformations and recoveries corresponding to said force, a frame means, means for mounting the said sample in said frame means, two sensing means diametrically mounted on said frame means relative to the said sample, each said sensing means adapted and arranged to operatively engage the said sample to detect a deformation of the said sample when the said sample is mounted in said frame means, each said sensing means comprising:

a housing, an element pivotally mounted in said housing, said element having a first end positioned adjacent to the said sample when said sample is mounted in said frame means, and a second end, adjustable means mounted in said first end and positioned to adjustably contact the said sample, said adjustable means adapted and arranged to be displaced by a deformation of the said sample to displace said first end thereby to pivotally displace said element, detector means engaging said second end of said element to be operated thereby, an electrical signal generating means operatively connected to said detector means to generate a signal proportional to said displacement of said first end, and means for recording said signal operatively connected to said signal generating means.

9. An apparatus for use in measuring the resiliency of a solid cylindrical sample of an asphaltic concrete material comprising:

a stationary base, a first receiving element on said base for receiving a said sample to be measured, a movable support adjustably connected to said stationary base to move toward and away from said stationary base, a pulsating force exerting means affixed to said movable support and positioned to exert a force toward said first receiving element and to relieve said force, thereby to apply and relieve said force to the said sample when the said sample is being measured, thereby to deform said sample and allow recovery thereof, a force detector means operatively connected to said pulsating force exerting means to detect a force exerted thereby, a first electrical signal generating means operatively connected to said force detector means to generate a first signal proportional to said force so detected, means operatively connected to said first signal generating means for recording said first signal, a second receiving element for the said sample removably operatively connected to said force detector means to engage the said sample at a position on the said sample diametrically opposite that of said first receiving element, a rectangular frame structure adapted and arranged to diametrically surround the said sample to be measured, means for securely mounting the said sample to be measured in said frame structure, a first detector means adjustably mounted in the central portion of one of the side members of said rectangular frame structure, a second detector means adjustably mounted in the central portion of an oppositely positioned member of said rectangular frame structure, said first and said second detector means positioned to contact the said sample to be measured on diametrically opposite sides thereof to detect a deformation and a recovery of the said sample mounted in said frame, a second electrical signal generating means operatively connected to each of said detector means to generate a second signal proportional to said deformation and said recovery, and means operatively connected to said second signal generating means for recording said second signal.

10. An apparatus for use in measuring the resiliency of a solid cylindrical sample of an asphaltic concrete material comprising:

a stationary base, a first receiving element on said base for receiving a said sample to be measured, a plurality of screw-threaded elements rigidly affixed to said base, and extending laterally therefrom, a movable support slideably engaging said screw-threaded elements to slideably move toward and away from said stationary base, nut means threaded on said screw-threaded elements and operatively engaging said screw-threaded elements to adjustably fix said movable support on said screw-threaded elements, a pulsating force exerting means affixed to said movable support and positioned to exert a force toward said first receiving element and to relieve said force, thereby to apply and relieve said force to the said sample when a said sample is being measured, thereby to deform said sample and allow recovery thereof, a force detector means operatively connected to said pulsating force exerting means to detect a force exerted thereby, a first electrical signal generating means operatively connected to said force detector means to generate a first signal proportional to said force so detected, means operatively connected to said first signal generating means for recording said first signal, a second receiving element for the said sample removably operatively connected to said force detector means to engage the said sample at a position on said sample diametrically opposite that of said first receiving element, a rectangular frame structure adapted and arranged to diametrically surround the said sample, means for securely mounting the said sample in said frame structure, a first detector means adjustably mounted in the central portion of one of the side members of said rectangular frame structure, a second detector means adjustably mounted in the central portion of an oppositely positioned member of said rectangular frame structure, said first and said second detector means positioned to contact the said sample on diametrically opposite sides thereof to detect a deformation and recovery of the said sample mounted in said frame, a second electrical signal generating means operatively connected to each of said detector means to generate a second signal proportional to said deformation and said recovery, and means operatively connected to said second signal generating means for recording said second signal.

11. An apparatus of claim 10 including a handle means affixed to said movable support to enable said movable support to be slideably positioned on said screw-threaded elements.

12. An apparatus of claim 11 wherein said pulsating force exerting means is a pneumatic motor.

13. An apparatus for use in measuring the resiliency of a solid cylindrical sample of an asphaltic concrete material comprising:

a stationary base, a first receiving element on said base for receiving a said sample to be measured, a second receiving element positioned in alignment with the said first receiving element to engage the said sample at a position on the said sample diametrically opposite to that of said first receiving element, a force detector means operatively connected to said second receiving element, a first electrical signal generating means, said force detector means operatively connected to said first electrical signal generating means to generate a first signal proportional to a force applied to said force detector, means operatively connected to said first electrical signal generating means for recording said first signal, a pulsating force exerting means operatively connected to said force detector positioned to exert a force to said force detector and to relieve said force, thereby to apply and relieve said force to a said sample when a said sample is being measured, thereby to deform said sample and allow recovery thereof, a movable support securely affixed to said pulsating force exerting means and adjustably connected to said stationary base to move toward and away from said base to adjustably position said pulsating force exerting means, said force detector means, said force detector means and said second receiving element relative to said first receiving element, a rectangular frame structure adapted and arranged to diametrically surround the said sample to be measured, means for securely mounting the said sample in said frame structure, a first detector means adjustably mounted in the central portion of one of the side members of said rectangular frame structure, a second detector means adjustably mounted in the central portion of an oppositely positioned member of said rectangular frame structure, said first and said second detector means positioned to contact the said sample to be measured on diametrically opposite sides thereof to detect a deformation and recovery of the said sample mounted in said frame, a second electrical signal generating means operatively connected to each of said detector means to generate a second signal proportional to said deformation and said recovery, and means operatively connected to said second signal generating means for recording said second signal.

14. An apparatus for use in measuring the resiliency of a solid cylindrical sample of an asphaltic concrete material comprising:

a stationary base, a plurality of screw-threaded elements rigidly affixed to said base, and extending laterally therefrom, a first receiving element on said base for receiving a said sample to be measured, a second receiving element positioned in alignment with the said first receiving element to engage the said sample at a position on the said sample diametrically opposite to that of said first receiving element, a force detector means operatively connected to said second receiving element, a first electrical signal generating means, said force detector means operatively connected to said first electrical signal generating means to generate a first signal proportional to a force applied to said force detector, means operatively connected to said first electrical signal generating means for recording said first signal, a pulsating force exerting means operatively connected to said force detector positioned to exert a force to said force detector and to relieve said force, thereby to apply and relieve said force to the said sample when the said sample is being measured, thereby to deform said sample and allow recovery thereof, a movable support slideably engaging said screw-threaded elements to slideably move toward and away from said stationary base, said movable support securely affixed to said pulsating force exerting means, nut means threaded on said screw-threaded elements and operatively engaging said screw-threaded elements to adjustably fix said movable support on said screw-threaded elements, a rectangular frame structure adapted and arranged to diametrically surround the said sample to be measured, means for securely mounting the said sample in said frame structure, a first detector means adjustably mounted in the central portion of one of the side members of said rectangular frame structure, a second detector means adjustably mounted in the central portion of an oppositely positioned member of said rectangular frame structure, said first and said second detector means positioned to contact the said sample to be measured on diametrically opposite sides thereof to detect a deformation and a recovery of the said sample mounted in said frame, a second electrical signal generating means operatively connected to each of said second detector means to generate a second signal proportional to said deformation, and means operatively connected to said second signal generating means for recording said second signal.

15. An apparatus of claim 14 including a handle means affixed to said movable support to enable said movable support to be slideably positioned on said screw-threaded elements.

16. An apparatus of claim 15 wherein said pulsating force exerting means is a pneumatic motor.

17. An apparatus for use in measuring the resiliency of a solid cylindrical sample of an asphaltic concrete material comprising:
a stationary base,
a first receiving element on said base for receiving a said sample to be measured,
a movable support adjustably connected to said stationary base to move toward and away from said stationary base,
a pulsating force exerting means affixed to said movable support and positioned to exert a force toward said first receiving element and to relieve said force, thereby to apply and relieve said force to the said sample when the said sample is being measured, thereby to deform said sample and allow recovery thereof,
a force detector means operatively connected to said pulsating force exerting means to detect a force exerted thereby,
a first electrical signal generating means operatively connected to said force detector means to generate a first signal proportional to said force so detected, means operatively connected to said first signal generating means for recording said first signal,
a second receiving element for the said sample removably operatively connected to said force detector means to engage the said sample at a position on the said sample diametrically opposite that of said first receiving element,
a rectangular frame structure adapted and arranged to diametrically surround the said sample to be measured,
means for securely mounting the said sample to be measured in said frame structure,
two sensing means diametrically mounted relative to the said sample on oppositely positioned members of said rectangular frame structure, each of said sensing means comprising:
a housing fixedly secured to said frame and extending laterally at right angles to the plane of said frame, an element pivotally mounted in said housing, said element having a first end and a second end, said ends being located on opposite sides of said pivot, said first end being constructed to be positioned adjacent to the said sample when said sample is mounted in said frame,
an adjustable screw means screw-threadedly mounted in said first end and positioned to be adjusted toward and away from the location to be occupied by the said sample to contact the said sample when said sample is mounted in said frame and to be retracted therefrom, said adjustable screw means adapted to be displaced and to displace said first end proportional to a deformation of said sample caused by said force,
a clamp means adjustably clamped to said second end of said element,
second detector means fixedly secured to said clamp means to be operated by a displacement of said clamp means,
a second electrical signal generating means operatively connected to said second detector means to generate a second signal proportional to said displacement of said first end, and
means operatively connected to said second signal generating means for recording said second signal.

18. An apparatus for use in measuring the resiliency of a solid cylindrical sample of an asphaltic concrete material comprising:
a stationary base,
a first receiving element on said base for receiving a said sample to be measured,
a plurality of screw-threaded elements rigidly affixed to said base and extending laterally therefrom,
a movable support slideably engaging said screw-threaded elements to slideably move toward and away from said stationary base,
nut means threaded on said screw-threaded elements and operatively engaging said screw-threaded elements to adjustably fix said movable support on said screw-threaded elements,
a pulsating force exerting means affixed to said movable support and positioned to exert a force toward said first receiving element and to relieve said force, thereby to apply and relieve said force to the said sample when the said sample is being measured, thereby to deform said sample and allow recovery thereof,
a force detector means operatively connected to said pulsating force exerting means to detect a force exerted thereby,
a first electrical signal generating means operatively connected to said force detector means to generate a first signal proportional to said force so detected,
means operatively connected to said first signal generating means for recording said first signal,
a second receiving element for the said sample removably operatively connected to said force detector means to engage the said sample at a position on the said sample diametrically opposite that of said first receiving element,
a rectangular frame structure adapted and arranged to diametrically surround the said sample,
means for securely mounting the said sample in said frame structure,
two sensing means diametrically mounted relative to the said sample on oppositely positioned members of said rectangular frame structure, each of said sensing means comprising:
a housing fixedly secured to said frame and extending laterally at right angles to the plane of said frame, an element pivotally mounted in said housing, said element having a first end and a second end, said ends being located on opposite sides of said pivot, said first end being constructed to be positioned adjacent to the said sample when said sample is mounted in said frame,
an adjustable screw means screw-threadedly mounted in said first end and positioned to be adjusted toward and away from the location to be occupied by the said sample to contact the said sample when said sample is mounted in said frame and to be retracted therefrom, said adjustable screw means adapted to be displaced and to displace said first end proportional to a deformation of said sample caused by said force,
a clamp means adjustably clamped to said second end of said element,
second detector means fixedly secured to said clamp means to be operated by a displacement of said clamp means,
a second electrical signal generating means operatively connected to said second detector means to generate a second signal proportional to said displacement of said first end, and
means operatively connected to said second signal generating means for recording said second signal.

19. An apparatus of claim 18 including a handle means affixed to said movable support to enable said movable support to be slideably positioned on said screw-threaded elements.

20. An apparatus of claim 19 wherein said pulsating force exerting means is a pneumatic motor.

21. An apparatus for use in measuring the resiliency of a solid cylindrical sample of an asphaltic concrete material comprising:
a stationary base,
a first receiving element on said base for receiving a said sample to be measured,
a second receiving element positioned in alignment with the said first receiving element to engage the said sample at a position on the said sample diametrically opposite to that of said first receiving element,
a force detector means operatively connected to said second receiving element,
a first electrical signal generating means,
said forst detector means operatively connected to said first electrical signal generating means to generate a first signal proportional to a force applied to said force detector,
means operatively connected to said first electrical signal generating means for recording said first signal,
a pulsating force exerting means operatively connected to said force detector positioned to exert a force to said force detector and to relieve said force, thereby to apply and relieve said force to the said sample when the said sample is being measured, thereby to deform said sample and allow recovery thereof,
a movable support securely affixed to said pulsating force exerting means and adjustably connected to said stationary base to move toward and away from said base to adjustably position said pulsating force exerting means, said force detector means and said second receiving element relative to said first receiving element,
a rectangular frame structure adapted and arranged to diametrically surround the said sample to be measured,
means for securely mounting the said sample in said frame structure,
two sensing means diametrically mounted relative to the said sample on oppositely positioned members of said rectangular frame structure, each of said sensing means comprising:
a housing fixedly secured to said frame and extending laterally at right angles to the plane of said frame, an element pivotally mounted in said housing, said element having a first end and a second end, said ends being located on opposite sides of said pivot, said first end being constructed to be positioned adjacent to the said sample when said sample is mounted in said frame,
an adjustable screw means screw-threadedly mounted in said first end and positioned to be adjusted toward and away from the location to be occupied by the said sample to contact the said sample when said sample is mounted in said frame and to be retracted therefrom, said adjustable screw means adapted to be displaced and to displace said first end proportional to a deformation of said sample caused by said force,
a clamp means adjustably clamped to said second end of said element,
second detector means fixedly secured to said clamp means to be operated by a displacement of said clamp means,
a second electrical signal generating means operatively connected to said second detector means to generate a second signal proportional to said displacement of said first end, and means operatively connected to said second signal generating means for recording said second signal.

22. An apparatus for use in measuring the resiliency of a solid cylindrical sample of an asphaltic concrete material comprising:
a stationary base,
a plurality of screw-threaded elements rigidly affixed to said base, and extending laterally therefrom,
a first receiving element on said base for receiving a said sample to be measured,
a second receiving element positioned in alignment with the said first receiving element to engage the said sample at a position on the said sample diametrically opposite to that of said first receiving element,
force detector means operatively connected to said second receiving element,
a first electrical signal generating means,
said force detector means operatively connected to said first electrical signal generating means to generate a first signal proportional to a force applied to said force detector,
means operatively connected to said first electrical signal generating means for recording said first signal,
a pulsating force exerting means operatively connected to said force detector positioned to exert a force to said force detector and to relieve said force, thereby to apply and relieve said force to the said sample when the said sample is being measured, thereby to deform said sample and allow recovery thereof,
a movable support slideably engaging said screw-threaded elements to slideably move toward and away from said stationary base, said movable support securely affixed to said pulsating force exerting means,
nut means threaded on said screw-threaded elements and operatively engaging said screw-threaded elements to adjustably fix said movable support on said screw-threaded elements,
a rectangular frame structure adapted and arranged to diametrically surround the said sample to be measured,
means for securely mounting the said sample in said frame structure,
two sensing means diametrically mounted relative to the said sample on oppositely positioned members of said rectangular frame structure, each of said sensing means comprising:
a housing fixedly secured to said frame and extending laterally at right angles to the plane of said frame,
an element pivotally mounted in said housing, said element having a first end and a second end, said ends being located on opposite sides of said pivot, said first end being constructed to be positioned adjacent to the said sample when said sample is mounted in said frame,
an adjustable screw means screw-threadedly mounted in said first end and positioned to be adjusted toward and away from the location to be occupied by the said sample to contact the said sample when said sample is mounted in said frame and to be retracted therefrom, said adjustable screw means adapted to be displaced and to displace said first end proportional to a deformation of said sample caused by said force,
a clamp means adjustably clamped to said second end of said element,
second detector means fixedly secured to said clamp means to be operated by a displacement of said clamp means,
a second electrical signal generating means operatively connected to said second detector means to generate a second signal proportional to said displacement of said first end, and
means operatively connected to said second signal generating means for recording said second signal.

23. An apparatus of claim 22 including a handle means affixed to said movable support to enable said movable support to be slideably positioned on said screw-threaded elements.

24. An apparatus of claim 23 wherein said pulsating force exerting means is a pneumatic motor.

* * * * *